United States Patent
Hsieh et al.

(10) Patent No.: US 11,537,974 B2
(45) Date of Patent: *Dec. 27, 2022

(54) PREDICTIONS BY USING BEACONS IN A REAL-TIME LAST MILE LOGISTICS PLATFORM

(71) Applicant: DoorDash, Inc., San Francisco, CA (US)

(72) Inventors: Anderthan Hsieh, Saratoga, CA (US); Thomas Edward Taylor, San Francisco, CA (US); Thomas Edward Belluscio, San Francisco, CA (US); Xilin Alexander Liu, San Francisco, CA (US)

(73) Assignee: DoorDash, Inc., San Francisco, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/314,509

(22) Filed: May 7, 2021

(65) Prior Publication Data
US 2021/0264355 A1    Aug. 26, 2021

Related U.S. Application Data

(63) Continuation of application No. 15/826,737, filed on Nov. 30, 2017, now Pat. No. 11,144,867.

(51) Int. Cl.
*G06Q 10/08* (2012.01)
*H04W 4/02* (2018.01)
*H04W 4/80* (2018.01)

(52) U.S. Cl.
CPC ..... *G06Q 10/0832* (2013.01); *G06Q 10/0833* (2013.01); *G06Q 10/0834* (2013.01); *H04W 4/023* (2013.01); *H04W 4/80* (2018.02)

(58) Field of Classification Search
CPC ......... G06Q 10/0832; G06Q 10/0833; G06Q 10/0834; H04W 4/023; H04W 4/80
(Continued)

(56) References Cited

U.S. PATENT DOCUMENTS 10,129,704 B1 * 11/2018 Huseth ............... G08B 21/0294
11,144,867 B2    10/2021 Hsieh et al.
(Continued)

OTHER PUBLICATIONS

"United Parcel Services: Delivering Packages and E-commerce solutions" Published by MIT Sloan (Year: 2001).*
(Continued)

*Primary Examiner* — Zeina Elchanti
(74) *Attorney, Agent, or Firm* — Kwan & Olynick LLP

(57) ABSTRACT

Provided are mechanisms and processes for facilitating a real-time, on-demand delivery platform for perishable goods by determining aspects such as the location and status of a courier who is affiliated with a delivery platform. In one example, a courier carries a Bluetooth Low Energy (BLE) enabled mobile device that is configured to detect signals from beacons located at both a vehicle registered to the courier and a provider site. Each of the detected signals includes identifying information and signal strength of the detected signal. The identifying information and signal strengths are transmitted to a server that monitors the signal strengths received at the courier's BLE-enabled mobile device from the beacon devices to determine the likelihood that the courier has arrived at the provider site.

20 Claims, 11 Drawing Sheets

(58) Field of Classification Search
USPC .......................................................... 705/332
See application file for complete search history.

(56) References Cited

U.S. PATENT DOCUMENTS

| | | | |
|---|---|---|---|
| 2015/0373762 A1 | 12/2015 | Raj et al. | |
| 2016/0094598 A1* | 3/2016 | Gedikian | H04L 65/611 |
| | | | 455/456.3 |
| 2016/0343178 A1* | 11/2016 | Lesesky | G06K 19/07722 |
| 2017/0024789 A1* | 1/2017 | Frehn | G06Q 50/12 |
| 2019/0164119 A1 | 5/2019 | Hsieh et al. | |

OTHER PUBLICATIONS

U.S. Appl. No. 15/826,737, Non-Final Rejection, dated Nov. 3, 2020, 14 pgs.

U.S. Appl. No. 15/826,737, Requirement for Restriction/Election, dated Jun. 15, 2020, 6 pgs.

U.S. Appl. No. 15/826,737, Examiner Interview Summary dated Feb. 2, 2021, 4 pgs.

U.S. Appl. No. 15/826,737, Examiner Interview Summary dated Mar. 10, 2021, 1 pg.

U.S. Appl. No. 15/826,737, Notice of Allowance dated Mar. 10, 2021, 13 pgs.

Cross-Platform Development for an online Food Delivery Application Published by International Islamic University Chittagong, Bangladesh (Year: 2017).

Kosir, Dan, Location-Based Technology for Mobile Apps: Beacons vs. GPS vs. WiFi, 10pgs.

Technological Disruption and Innovation in Last Mile Delivery, GSB.Stanford.Edu/R/VCII, Jun. 2016, 26 pgs.

* cited by examiner

PREDICTIONS BY USING BEACONS IN A REAL-TIME LAST MILE LOGISTICS PLATFORM

CROSS-REFERENCE TO RELATED APPLICATIONS

This application is a continuation of U.S. patent application Ser. No. 15/826,737 entitled: "PREDICTIONS BY USING BEACONS IN A REAL-TIME LAST MILE LOGISTICS PLATFORM" filed on Nov. 30, 2017, which is incorporated herein by reference in its entirety for all purposes.

TECHNICAL FIELD

The present disclosure relates to a system for facilitating a real-time, on-demand delivery platform for perishable goods. In one example, the present disclosure relates to mechanisms and processes for determining the location and status of a courier.

BACKGROUND

Logistics platforms, particularly real-time on-demand delivery platforms of perishable goods, rely on accurate location and status information to effectively and efficiently connect consumers with providers. Unfortunately, conventional mechanisms for determining location and status are at best noisy and at worst wrong.

Consequently, it is desirable to provide improved mechanisms for determining location and status, particularly with respect to real-time on-demand delivery platforms of perishable goods.

SUMMARY

Provided are various mechanisms and processes relating to a system for facilitating a real-time, on-demand delivery platform for perishable goods by determining aspects such as the location and status of a courier who is affiliated with the delivery platform.

In one aspect, which may include at least a portion of the subject matter of any of the preceding and/or following examples and aspects, a system includes a first beacon device located at a vehicle registered to a courier and a second beacon device located at a provider site. The courier has a Bluetooth Low Energy (BLE) enabled mobile device that is configured to detect signal strength and identification information from the first beacon device and the second beacon device. The courier is affiliated with a delivery platform that allows a customer to order and receive perishable goods on-demand in real time, and the vehicle registered to the courier is used to transport the perishable goods from a provider site to the customer. The provider site prepares perishable goods in response to orders placed by customers through the delivery platform.

In another aspect, which may include at least a portion of the subject matter of any of the preceding and/or following examples and aspects, a method involves detecting signals from beacon devices at a Bluetooth Low Energy (BLE) enabled mobile device that is carried by a courier who is affiliated with a delivery platform. The BLE-enabled device detects signals from beacons located at both a vehicle registered to the courier and a provider site. Each of the detected signals includes identifying information and signal strength of the detected signal. The identifying information and signal strengths are transmitted to a server that monitors the signal strengths received at the courier's BLE-enabled mobile device from the beacon devices to determine when the courier has arrived at the provider site.

These and other embodiments are described further below with reference to the figures.

DETAILED DESCRIPTION OF EXAMPLE EMBODIMENTS

Figure 1:
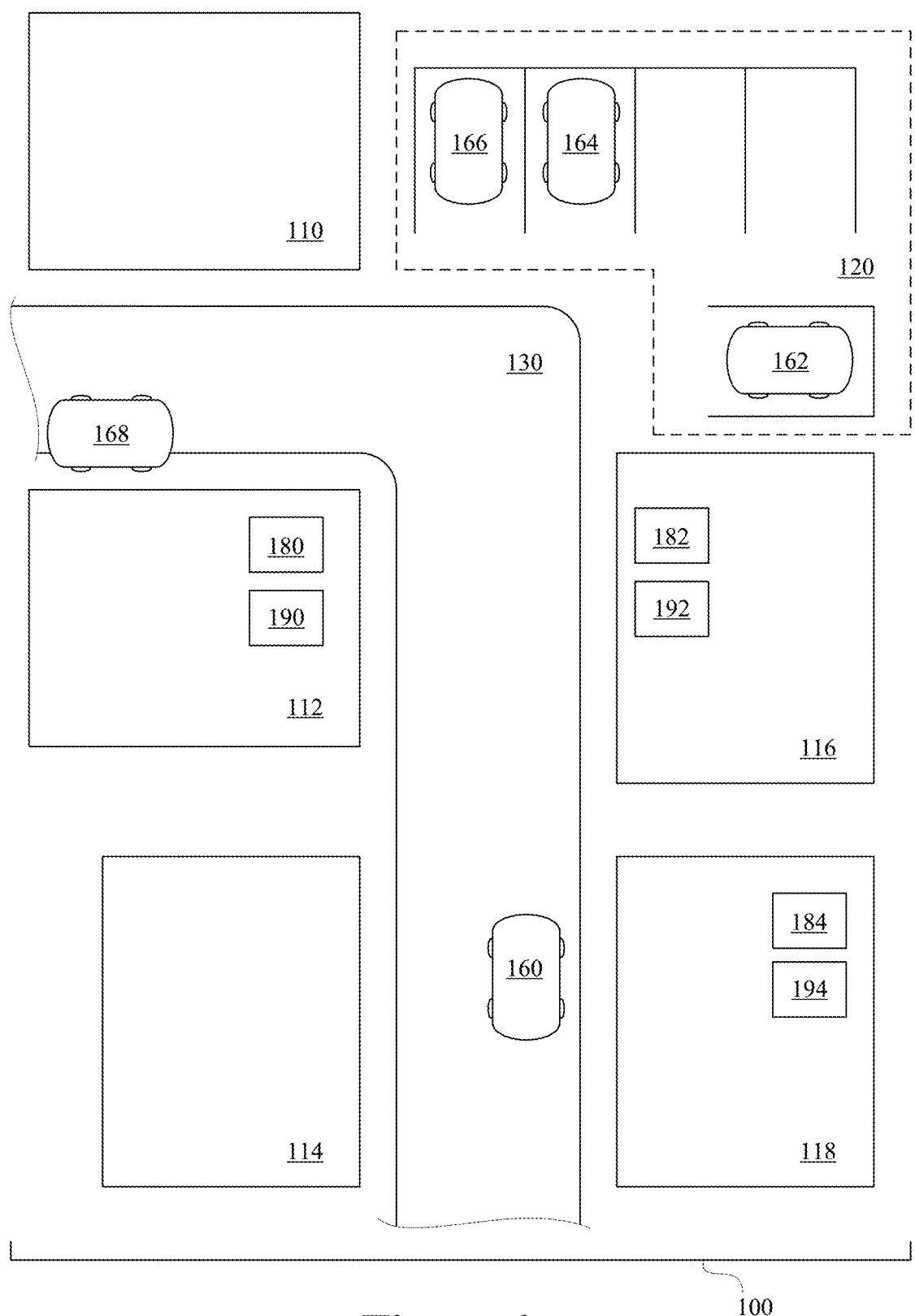
FIG. 1 illustrates one example of a map that includes provider sites and delivery vehicles participating in a delivery platform.

Reference will now be made in detail to some specific examples of the present disclosure including the best modes contemplated by the inventors for carrying out the present disclosure. Examples of these specific embodiments are illustrated in the accompanying drawings. While the present disclosure is described in conjunction with these specific embodiments, it will be understood that it is not intended to limit the present disclosure to the described embodiments. On the contrary, it is intended to cover alternatives, modifications, and equivalents as may be included within the spirit and scope of the present disclosure as defined by the appended claims.

For example, the techniques of the present invention will be described in the context of particular protocols, such as Bluetooth Low Energy (BLE). However, it should be noted that the techniques of the present invention may also be applied to variations of protocols. In the following description, numerous specific details are set forth in order to provide a thorough understanding of the present invention. Particular example embodiments of the present invention may be implemented without some or all of these specific details. In other instances, well known process operations have not been described in detail in order not to unnecessarily obscure the present invention.

Various techniques and mechanisms of the present invention will sometimes be described in singular form for clarity. However, it should be noted that some embodiments include multiple iterations of a technique or multiple instantiations of a mechanism unless noted otherwise. For example, a system uses a processor in a variety of contexts. However, it will be appreciated that a system can use multiple processors while remaining within the scope of the present invention unless otherwise noted. Furthermore, the techniques and mechanisms of the present invention will sometimes describe a connection between two entities. It should be noted that a connection between two entities does not necessarily mean a direct, unimpeded connection, as a variety of other entities may reside between the two entities. For example, a processor may be connected to memory, but it will be appreciated that a variety of bridges and controllers may reside between the processor and memory. Consequently, a connection does not necessarily mean a direct, unimpeded connection unless otherwise noted.

With regard to the present disclosure, real-time on-demand delivery platforms of perishable goods rely on accurate location and status information to allow for effective and efficient delivery experiences between providers and customers. In particular, customers want to know when to expect particular orders to arrive, providers want to know when a courier is arriving, and oversight requires knowing how to efficiently route couriers based on real-time location and status information. However, existing location information services have significant drawbacks.

One location information service commonly used by various individuals, businesses, drivers, etc. is Global Positioning System (GPS). However, GPS has numerous drawbacks, such as significant noise and many false positives. In some implementations, GPS has been used with geofencing such that when a courier has arrived within a perimeter of a restaurant or grocery store, it is determined that the courier has arrived. However, one problem is that GPS signals may drift so that the courier appears to be within the perimeter of the geofence even when they are not. Accordingly, GPS may sometimes misreport the location of a courier, thereby reducing the accuracy and efficiency of delivery platforms.

Another problem that it is also common with GPS is that a courier may drive by a restaurant and move within the geofence or restaurant perimeter, but not be able to find parking and have to drive away to search for parking. In this case, even though the courier was detected within the geofence, the courier had not really arrived at the destination yet. Accordingly, basing arrival on the detection of the courier within the geofence may be very inaccurate, especially when the driver takes a long time to find parking.

A similar location information service that also has similar problems and drawbacks uses cell tower triangulation to locate particular couriers or other entities. Both of these services also have the drawback of requiring access to a strong enough GPS or cell signal locate a courier. If there is no GPS or cell service available, if the signals are weak, or if nearby buildings or structures block the signals, these location information services will not work reliably.

Another approach to determining location information has been to ask a courier to manually indicate when the courier has arrived at a restaurant, picked up a delivery, or finished dropping off a delivery with a customer. However, couriers are often unreliable and sometimes even misrepresent their location in order to try to get certain delivery jobs or have different delivery assignments offered to them. As used herein, an assignment of an order or delivery may refer to the pairing of an order with a courier or runner and providing the courier or runner with a delivery opportunity to deliver the order to the corresponding delivery destination, which may be accepted or declined by the courier or runner. Most couriers will not mark that they are at the restaurant the second they walk into the restaurant. Some will report it early, and others will report it a lot later on. Among other disadvantages, this inconsistency in manual reporting makes it difficult for efficiently providing time estimates for pickups and deliveries.

Accordingly, the present disclosure describes various examples of mechanisms and processes that provide ways of determining when a courier has arrived at a destination, such as a provider site, and determining the location of a courier in real-time. In some examples, a system determines when a courier has arrived at a provider site when a vehicle associated with the courier has been detected in proximity to a provider site that is preparing an order for a current delivery, and the courier has left the vehicle. By detecting that the courier has left the vehicle in proximity to the provider site, the system can more accurately determine when the courier has actually arrived. Additionally, in some examples, the system determines the location of the courier and/or a vehicle associated with the courier by using triangulation.

In various embodiments, the systems used to determine the location of a courier use Bluetooth Low Energy (BLE) beacons and BLE-enabled devices that are capable of detecting signals emitted by the BLE beacons. By using BLE beacons and devices, the system can provide more accurate location information of a courier and can avoid the drawbacks of GPS, cell tower triangulation, and manual location entry. Specifically, the system can be used when there are weak or nonexistent GPS or cell signals. The system also detects location automatically without requiring any input from a courier. As described in examples of various mechanisms and processes herein, the use of BLE beacons and BLE-enabled devices to provide location services yields increased efficiency and accuracy, in addition to other benefits, for a real-time, on-demand, delivery platform for perishable goods.

With reference to FIG. 1, shown is one example of a map showing provider sites and delivery vehicles that are participating in a delivery platform. In the present example, the delivery platform provides real-time, on-demand, delivery of perishable goods. For instance, a customer may order food from a restaurant by using a mobile device application that places the order through the delivery platform. In some instances, the user may also access the delivery platform through the internet via a computer, laptop, tablet, etc. When the customer orders the food through the delivery platform, the order is prepared at a provider site, where a courier will then pick up the order and delivery the order from the provider site to the customer.

As shown in FIG. 1, map 100 includes buildings or other structures 110, 112, 114, 116, and 118 such as restaurants, shops, or residences. The map also includes a parking lot 120, street 130, and vehicles 160, 162, 164, 166, and 168. In the present example, the delivery platform is used by three restaurants 112, 116, and 118. Each of these restaurants is equipped with a BLE-enabled device 180, 182, and 184, respectively, and at least one BLE beacon 190, 192, and 194, respectively. The BLE-enabled devices 180, 182, and 184 may be tablets, laptops, or other computing devices that are registered to the provider sites by the delivery platform. For instance, provider site 112 may be a Mexican restaurant that has a tablet 180 that is able to receive orders from customers through a delivery platform application, program, or other tool installed or otherwise accessible through the tablet 180. This delivery platform application, program or other tool allows communication about the orders between the provider site and the delivery platform.

In the present example, the provider site also includes a BLE beacon 190 that includes identifying information about the provider site that can be broadcast through a signal and detected by particular BLE-enabled devices. Although the BLE beacon 190 is shown as a separate device from BLE-enabled device 180, a BLE beacon 190 may be embedded or otherwise incorporated into the BLE-enabled device 180 in some embodiments. For instance, a BLE-enabled device may include a built-in BLE beacon.

According to various examples, a provider site prepares perishable goods such as food at a restaurant. However, in some examples, provider sites may also provide other perishable goods such as floral arrangements, medications, refrigerated or frozen items, live animals, etc. that may need real-time, on-demand delivery to a customer. Accordingly, although various examples in the present disclosure may describe the provider sites and delivery platform in the context of restaurants and food delivery, the mechanisms and processes described herein may also be applied to the delivery of various other perishable items.

In the present example, numerous vehicles 160, 162, 164, 166, and 168 are depicted on map 100. Vehicles 162, 164, 166, and 168 are parked either in parking lot 120 or along street 130. Vehicle 160 is traveling along street 130. In particular, for the purposes of describing FIGS. 1 and 2A-2C, vehicle 160 is associated with a courier that is affiliated with the delivery platform and headed to restaurant 118 to pick up an order for a customer who has ordered food from restaurant 118 through the delivery platform.

Figure 2A:
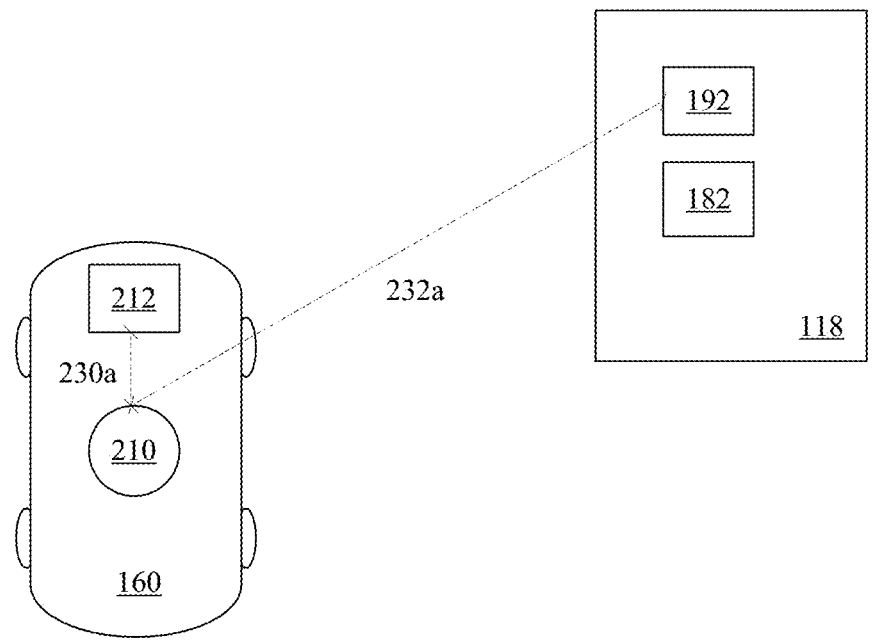
FIGS. 2A-2C illustrate examples of a courier approaching and arriving at a provider site.
Figure 2B:
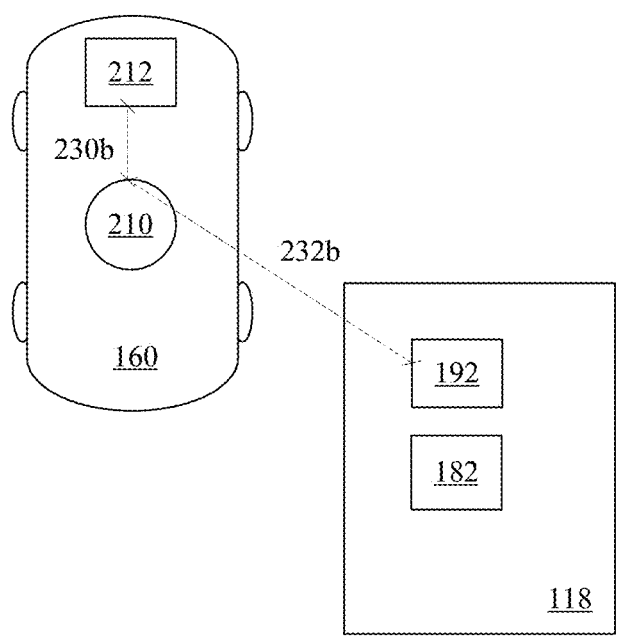
Figure 2C:
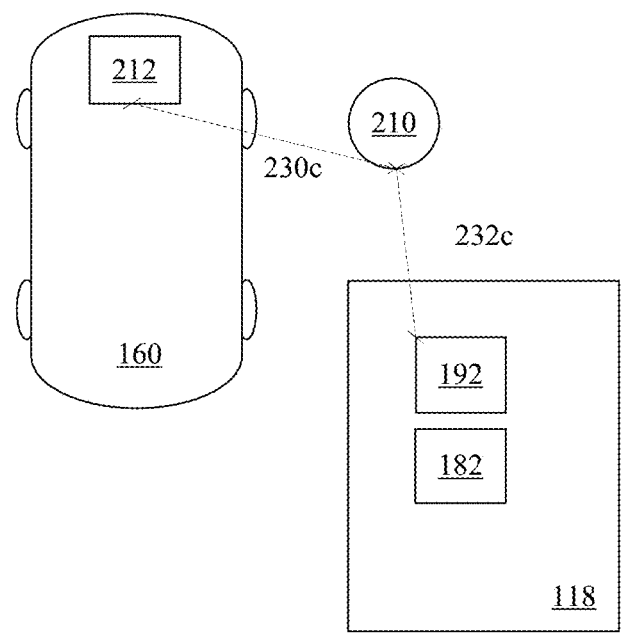

FIGS. 2A-2C illustrate examples of a courier approaching and arriving at a provider site. As mentioned with regard to FIG. 1, the courier is affiliated with the delivery platform and headed to a provider site to pick up an order for a customer who has placed an order through the delivery platform in real-time and on-demand for perishable goods. Once the courier picks up the order from the provider site, the courier uses the vehicle to transport the perishable goods from the provider site to the customer. The customer then receives the perishable goods from the courier in real-time.

For instance, if the customer wants to order pizza and salad from a particular service provider to be delivered to the customer's home (or other desired location) as soon as possible, such as within the hour, the customer places the order through the delivery platform using an application on a mobile device such as a smart phone. The order is then communicated to the appropriate provider site. The delivery platform then finds a courier to pick up the order from the provider site and deliver it to the customer. The delivery platform may also provide an estimate to the customer about when to expect arrival of the order based on information received from the provider site and the courier.

As described in various embodiments herein, the courier affiliated with the delivery platform can be a person, robot, or other individual or apparatus that is capable to delivering an order to a customer. Typically, the courier travels to a provider site using a vehicle registered to the courier through the delivery platform. In some examples, this vehicle is owned or leased by the courier and the delivery platform identifies the vehicle as registered to the particular courier for tracking and other purposes. Although the courier and vehicle are usually separate entities, it is possible that in some embodiments, the courier and vehicle can be integrated. For instance, a robot may serve as both the courier and vehicle in some applications.

In addition, according to various embodiments described in the present disclosure, the courier 210 carries a BLE-enabled device, such as a mobile device, smart phone, etc. that is used to communicate with the delivery platform and determine the location and/or status of the courier. In particular, the courier carries or wears the BLE-enabled device while driving, walking, waiting, or otherwise moving about. Accordingly, the courier and their corresponding BLE-enabled device are indicated together as a single entity for numerous examples described herein.

With reference to FIG. 2A, shown is a view of vehicle 160 approaching provider site 118. In the present example, a customer has ordered pizza and salad from provider site 118. A courier 210 is selected to pick up the order. As shown, the vehicle 160 is registered to courier 210 and is equipped with a BLE beacon device 212 that broadcasts signals with information about the BLE beacon device's identity. The BLE beacon device 212 is BLE-enabled hardware that is registered to the courier 210 and placed in or on vehicle 160. Signals emitted from BLE beacon device 212 can be detected by the BLE-enabled device carried by courier 210. In particular, identifying information and signal strength can be detected by the BLE-enabled device carried by courier 210. This identifying information includes a specific major and minor emitted by BLE beacon device 212 that indicates that the BLE beacon device 212 is associated with a courier, as opposed to a provider site, and that the BLE beacon device 212 is specifically associated with courier 210. When multiple BLE beacon devices within the system are located in proximity of each other, they do not emit the same combination of major/minor values.

In the present embodiment, the courier 210 is inside the vehicle as it approaches provider site 118. Provider site 118 includes a beacon device 192 and BLE-enabled device 182. BLE beacon device 192 broadcasts signals with information about the BLE beacon device's identity. The BLE-enabled device carried by courier 210 can detect and receive identifying information and signal strength information from BLE beacon devices 212 and 192. As described previously, the BLE-enabled device 182 associated with the provider site can be separate from the BLE beacon device associated with the provider site or combined, depending on the implementation of the system.

For instance, if combined, the BLE-enabled device 182 can be a tablet issued by the delivery platform to the provider site 118 and can act as a BLE beacon device 192 when Bluetooth on the tablet is turned on. According to various embodiments, the BLE-enabled device 182 may also detect and receive identifying information and signal strength information from BLE beacon 212. In some cases, BLE-enabled device 182 can also detect and receive identifying information and signal strength information from courier 210 if the courier's BLE-enabled mobile device is also activated as a BLE beacon device.

The BLE beacon devices 212 and 192 use Bluetooth Low Energy to transmit signals that advertise their presence to BLE-enabled devices. In particular, they advertise their identifying information, such as a Universally Unique Identifier (UUID), Major, and Minor values, along with signal strength. Specifically, BLE beacon device 212, which is registered to courier 210, and BLE beacon device 192, which is registered to provider site 118, each emits a specific major and minor indicating that they are associated with the specific courier 210 and provider site 118, respectively. In some examples, one major value may be assigned to all of the couriers and a different major value may be assigned to all of the provider sites. Additionally, the minor values may be assigned to uniquely identify each courier and provider site in the system. Accordingly, couriers and provider sites do not emit the same major and minor values. By assigning major and minor values in this manner, signals can be more efficiently identified so that signals emitted from couriers can be distinguished from signals from provider sites. Furthermore, with specific minor values assigned, particular couriers and provider sites can also be identified based on a detected signal.

When a BLE-enabled device is in proximity of a BLE beacon device, the BLE-enabled device can detect the identifying information and signal strength of the BLE beacon device. If the BLE beacon device is at a known location, such as a provider site, the distance of the BLE-enabled device from the known location can be estimated based on signal strength. Specifically, the stronger the signal detected, the shorter the distance between the BLE-enabled device and the BLE beacon device. The weaker the signal detected, the longer the distance between the BLE-enabled device and the BLE beacon device.

In the present embodiment, the courier 210 is located at a distance of 232a from the BLE beacon device 192 associated with provider site 118. Provider site 118 is at a known location and the strength of the signal emitted from the BLE beacon device 192 can be used to estimate the distance 232a. Although detecting a signal from BLE beacon device 192 at a BLE-enabled device associated with courier 210 indicates proximity of the courier 210 to the provider site 118, this does not necessarily mean that the courier has arrived at the site. In the present example, the courier 210 is still located in vehicle 160 at a distance of 230a from BLE beacon device 212.

With reference to FIG. 2B, shown is another view of vehicle 160 approaching provider site 118. In this example, the vehicle 160 has moved relative to provider site, such that courier 210 is now a distance 232b from BLE beacon device 192. As shown, the vehicle 160 appears to be closer to the provider site 118. However, it is uncertain whether the courier 210 has really arrived and parked at this location or if the courier 210 is either waiting in the car or still driving. As indicated, the courier 210 is still located in vehicle 160 at a distance of 230b from BLE beacon device 212. In particular, distance 230b appears to be the same or substantially the same as distance 230a, indicating that courier 210 is in the same location relative to vehicle 160 even though the location of vehicle 160 has changed relative to provider site 118.

With reference to FIG. 2C, shown is yet another view of vehicle 160 approaching provider site 118. In this example, the vehicle 160 has not moved again relative to provider site 118, but the courier has now left vehicle 160, such that courier 210 is now a distance 230c from BLE beacon device 212. This distance is greater than the distance 230b that was detected when the courier was still in the vehicle 160. Accordingly, by detecting an increase in distance between the courier 210 and BLE beacon device 212, a determination can be made that courier 210 has left vehicle 160.

In this example, the distance 232c between courier 210 and BLE beacon device 192 is decreasing, thereby indicating that courier 210 is approaching provider site 118. In particular, this decreasing distance 232c can be estimated based on the increasing strength of the signal emitted from BLE beacon device 192 and detected by the BLE-enabled device associated with courier 210.

As illustrated in the present example, when a courier 210 has arrived at a provider site 118, the distance 230c between the BLE beacon device 212 and courier 210 increases and the distance 232c between the BLE beacon device 192 and courier 210 decreases. When these two conditions are met, a determination can be made that the courier 210 has arrived at provider site 118. More practically, these two conditions may be considered to be met when the distance 230c exceeds a certain threshold and the distance 232c falls below a certain threshold, where these thresholds can be set as particular distances depending on the implementation of the system. For instance, the size of the provider site, the number of BLE beacon devices located at the provider site, the size of the vehicle, etc., and any other relevant factors can be used to determine appropriate threshold distances that would indicate arrival of a courier at a provider site.

In an alternate embodiment, the arrival of the courier 210 can also be determined based on information received by the BLE-enabled device 182 that is located at the provider site 118. Specifically, if the BLE-enabled mobile device associated with courier 210 is also activated as a BLE beacon device, then when the distance between the BLE-enabled device 182 and the courier reaches a certain threshold, as detected by increasing signal strength, and the distances between the BLE-enabled device 182 and BLE beacon device 212 and between the BLE-enabled device 182 and the courier begin to diverge, then a determination can be made that the courier 210 has arrived at the provider site 118. This works because when the vehicle 160 is nearing the provider site 118, both signals from 212 and 210 can be detected, but at a similar strength. As the strength of those two signals diverge and reach a certain threshold, this change indicates that the courier 210 has left the vehicle 160 while near the provider site 118.

Figure 3:
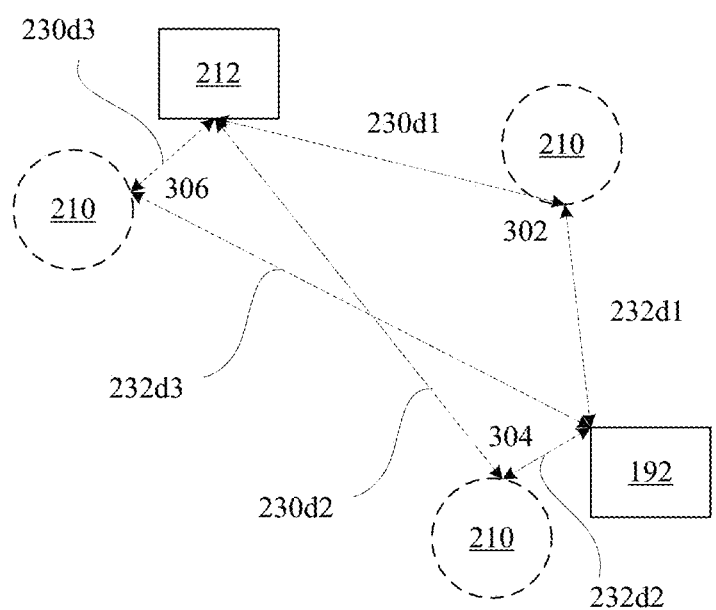
FIG. 3 is a diagrammatic representation of one example of a courier arriving at and departing from a provider site.

With reference to FIG. 3, shown is a diagrammatic representation of one example of a courier arriving at and departing from a provider site. In particular, this diagram follows the path of courier 210 upon leaving their vehicle, picking up an order, and returning to the vehicle. As described previously, if the strength of a connection between the courier's BLE-enabled mobile device and the BLE beacon device in the courier's vehicle is decreasing, this means that the courier is leaving the vehicle (e.g. has found parking and is moving away from the vehicle). When the courier is returning to the vehicle, the strength of the connection will increase.

Similarly, the strength of connection between the courier and the provider site (either between the provider site BLE beacon device and the BLE-enabled mobile device of the courier or between a BLE beacon device activated from the courier's BLE-enabled mobile device and the provider site's BLE-enabled device) can be used to determine when a courier has arrived at and departed from the provider site. For instance, when the courier walks into the provider site, the courier's mobile device will detect a beacon signal from the provider site and this signal will increase in strength as the courier approaches and enters the provider site and decrease in strength as the courier leaves the provider site.

According to various embodiments, information about signals detected by BLE-enabled mobile devices associated with couriers is then reported to servers operated by the delivery platform. Information about signals detected by BLE-enabled devices associated with provider sites can also be reported to servers. By reporting information about these detected signals to the servers, determinations can be made about when a courier has found parking and when the courier has arrived and left a provider site. In particular, based on the signal strength and identifying information, these determinations can be much more accurate than those made with previous systems.

In the present example, BLE beacon device 212 is located at the courier's vehicle and BLE beacon device 192 is located at the provider site. The courier 210 leaves the vehicle and moves to location 302, which is a distance 230d1 from BLE beacon device 212. When this distance 230*d*1 reaches a specified threshold, a determination can be made that the courier 210 has left the vehicle. At this location 302, courier is also a distance 232*dl* from BLE beacon device 192. As the courier 210 moves closer to the provider site, the signal from BLE beacon device 212 weakens and the signal from BLE beacon device 192 strengthens. Accordingly, a determination that the courier has left the vehicle can be made based on data indicating decreasing signal strength detected between BLE beacon device 212 and the courier's BLE-enabled mobile device 210.

Once the courier 210 has picked up the order from the provider site, the courier 210 then starts to leave the provider site and moves to location 304, which is a distance 232*d*2 from BLE beacon device 192 and a distance 230*d*2 from BLE beacon device 212. As the courier 210 moves away from the provider site, the signal from BLE beacon device 192 weakens and the signal from BLE beacon device 212 strengthens. When the signals reach a specified threshold, a determination can be made that the courier 210 has picked up the order and left the provider site.

Next, in the present example, the courier 210 leaves the provider site and moves to position 306, which is a distance 230*d*3 from BLE beacon device 212 and a distance 232*d*3 from BLE beacon device 192. When this distance 230*d*3 reaches a specified threshold, a determination can be made that the courier 210 has reached and/or boarded the vehicle. In particular, as the courier 210 moves away from the provider site, the signal from BLE beacon device 192 weakens and the signal from BLE beacon device 212 strengthens. When the signals reach a specified threshold, a determination can be made that the courier 210 has left the provider site and reached the vehicle.

Although the present example illustrates how BLE beacon devices and BLE-enabled devices can be used to determine when a courier has left a vehicle, arrived at a provider site, left a provider site, and arrived at a vehicle, these devices and techniques can also be used to determine when a courier has delivered an order to a customer. Specifically, if a customer chooses to turn on their device (e.g. mobile device, computing device, etc. used to place the order), the customer's device may also be able to send and/or receive BLE beacon signals that would allow the delivery platform to determine when a courier has arrived within the vicinity of the customer's delivery location. This determination could be made based on the strength of detected beacon signals between the courier's device(s) and the customer's device. Accordingly, using BLE beacon signals also allows the delivery platform to determine when a courier has arrived at a customer's delivery location, left the car, left the delivery location and returned to the car.

According to various examples, the provider sites may include one or more BLE beacon devices. The broadcasting strength of the BLE beacon device(s) and/or BLE-enabled device, such as a tablet, may be adjusted based on the size of the restaurant or store and placement of the beacon device(s) within the restaurant or store. Similarly, the broadcasting strength of the BLE beacon device located in the courier's vehicle may be adjusted to account for the size of the car and the location of the courier within the car.

Figure 4:
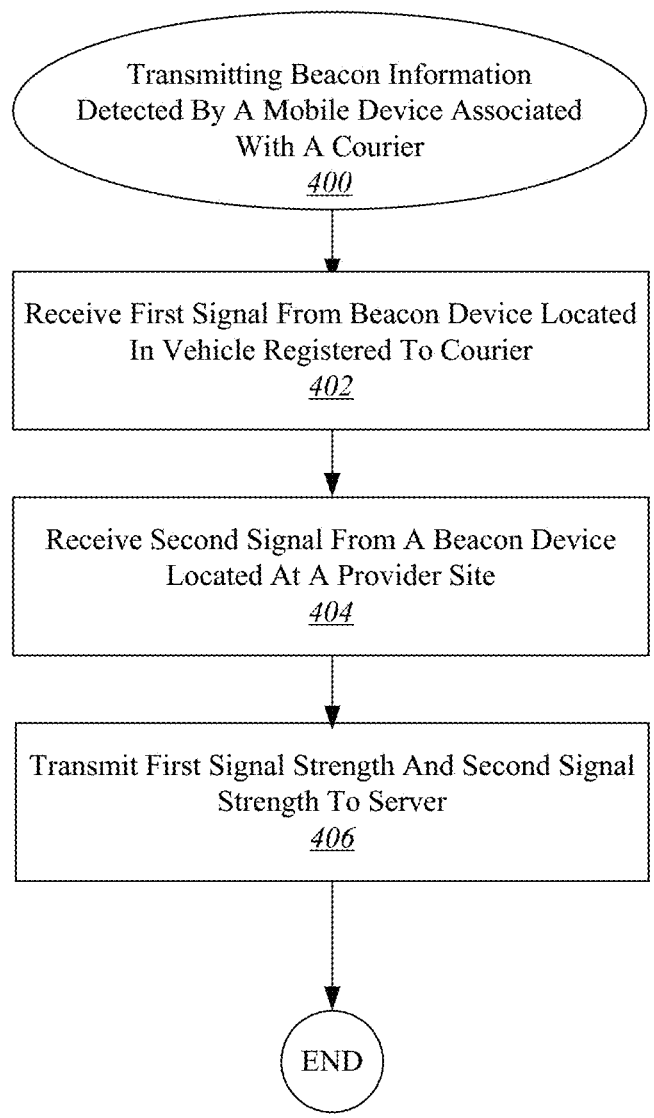
FIG. 4 is one example of a process for transmitting beacon information detected by a mobile device, where the mobile device is associated with a courier.

With reference to FIG. 4, shown is one example of a process for transmitting beacon information detected by a mobile device associated with a courier who is participating in a delivery platform that allows a customer to order and receive perishable goods on-demand, in real time. According to various embodiments, deliveries are monitored and coordinated at a server operated by a delivery platform. In particular, the locations and statuses of various couriers and provider sites are regularly provided to the server. In addition, vehicles used to transport the perishable goods from a provider site to a customer are also monitored.

In the present example, a BLE beacon device is placed in or on a vehicle that is registered by the delivery platform to a courier and used to transport the courier and orders for the delivery platform. The courier has a BLE-enabled mobile device that allows the delivery platform to monitor movements of the courier relative to the vehicle, provider sites, and customers. The BLE-enabled mobile device provides information to the server, including information about signals detected from BLE beacon devices.

As shown, process 400 begins when a first signal is received at the courier's mobile device from a first beacon device that is located in or on the vehicle registered to the courier at 402. The first signal has a first signal strength and first identifying information that are received by the mobile device. The identifying information includes data such as a universally unique identifier (UUID), minor, and major. In some examples, the first signal strength is calibrated appropriately such that when the courier leaves the vehicle, the first signal strength detected at the mobile device differs in a detectable manner from when the courier is in the vehicle. Specifically, if the first beacon device emits the first signal at a particular strength, then the strength of the first signal will depend on how far away the mobile device carried by the user is located from the first beacon device. Accordingly, when the courier is driving or otherwise in the vehicle, the first signal strength detected should not change significantly. However, when the courier leaves the vehicle, the signal strength of the first signal should decrease below a certain threshold to indicate that the courier has exited the vehicle.

In the present example, a second signal is received from a second beacon device located at the provider site at 404. As mentioned previously, the provider site prepares perishable goods in response to orders by consumers using the delivery platform. The second signal has a second signal strength and second identifying information that are received by the mobile device. The identifying information includes data such as a universally unique identifier (UUID), minor, and major. In some examples, the second signal strength is calibrated appropriately such that when the courier is in proximity of the provider site, the second signal is detectable by the mobile device. Specifically, if the second beacon device emits the second signal at a particular strength, then the strength of the second signal will depend on how far away the mobile device carried by the user is located from the second beacon device. Accordingly, when the courier arrives in proximity of the provider site, the signal strength of the second signal should increase to a detectable level and further increase above a certain threshold when the courier has entered the provider site and picked up an order.

Next, at 406, the first signal strength and the second signal strength are transmitted to a server associated with the delivery platform. The server monitors the first signal strength and the second signal strength to determine when the first courier has arrived at the provider site. In particular, when the first signal strength has fallen below a first designated threshold and when the second signal strength has exceeded a second designated threshold, then a determination can be made at the server that the courier has arrived at the provider site.

According to various embodiments, the process is repeated as signals are received at the mobile device. In addition, although the process described indicates that the first signal from the beacon device located in or at the vehicle is received before the second signal from the beacon device located at the provider site, either signal can be received first. For instance, if both beacons are emitting signals regularly, then the sequence of the signals received will depend on the timing of the emitted signals when the mobile device is in proximity of both.

Although the present example describes detecting and transmitting information about beacon signals from a beacon devices located in the vehicle and at the provider site to determine when a courier has arrived or departed the provider site, this process can also be used to detect and transmit information about beacon signals from beacon devices located in the vehicle, other provider sites, other vehicles, and the customer. If information about relative signal strength of these different beacon devices is transmitted to the server, an estimate can be made about the courier's general location and location relative to any of these beacon devices. If a customer turns on particular features on their device, the courier's mobile device can detect a signal from the customer's mobile device and an estimate can be made about when the courier has arrived within a vicinity of the customer's delivery location. Furthermore, if calibrated appropriately, a determination can also be made about when the courier has arrived at and departed from the customer's delivery location, thereby indicating that the order has been delivered.

Figure 5:
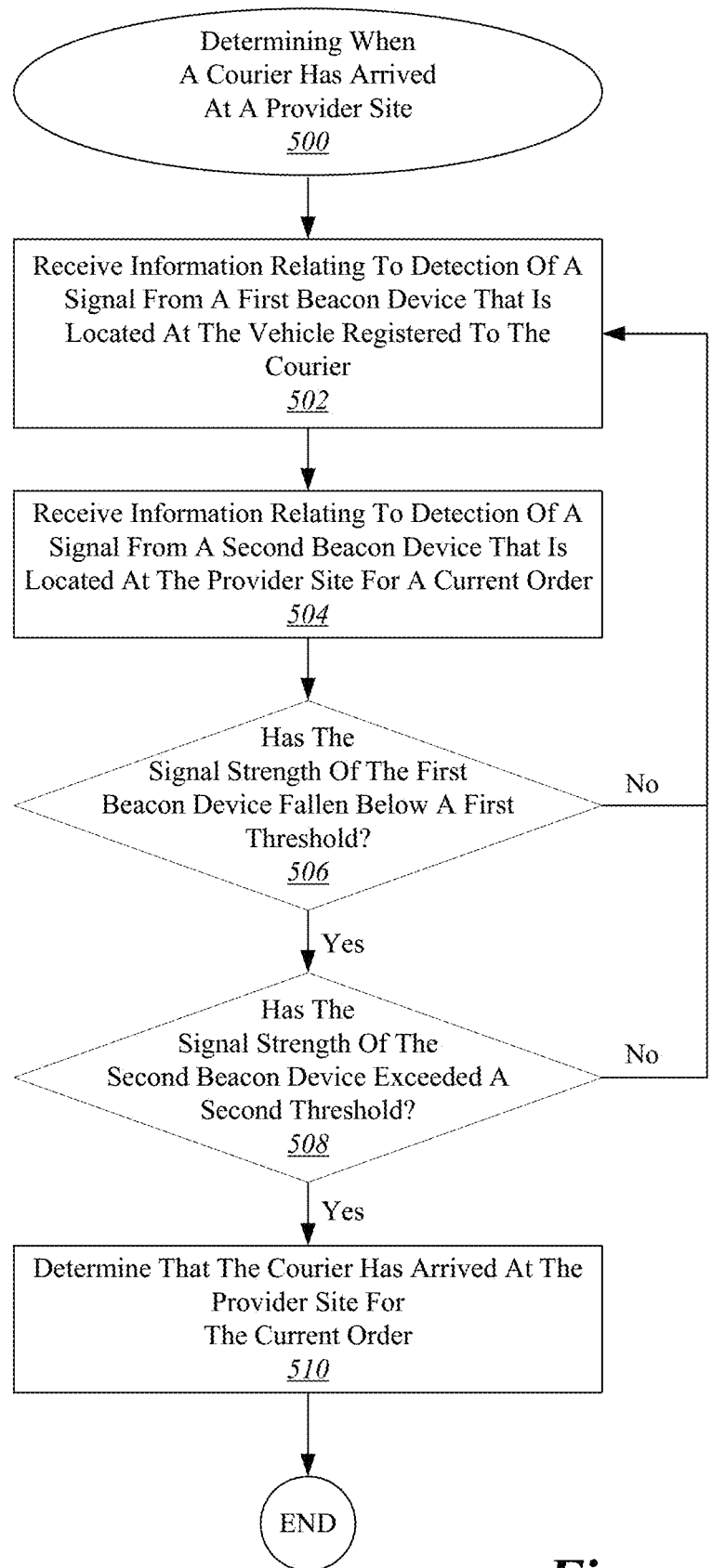
FIG. 5 is one example of a process for determining when a courier has arrived at a provider site.

With reference to FIG. 5, shown is an example of a process for determining when a courier has arrived at a provider site. In particular, process 500 involves receiving information from a courier's mobile device about the identity and strength of BLE beacon signals received at the courier's mobile device. Once received, this information is used to determine when a courier has arrived at a provider site by comparing the detected signal strengths to threshold values. Although this process relates to determining the arrival of a courier at a provider site, this process can also be used analogously to determine when the courier has reached a customer delivery location or other location. Furthermore, the information about signal strength and identity of one or more beacon devices that is used in the current example can also be detected and provided by a provider site's device, customer device, or other device in communication with the delivery platform's system.

In the present example, information relating to detection of a signal from a first beacon device that is located at the vehicle registered to the courier is received at 502. This signal is detected by the courier's mobile device, and includes signal strength and identifying information. The identifying information includes data such as a universally unique identifier (UUID), minor, and major. This information is then transmitted to and received by a server associated with the delivery platform.

Next, information relating to detection of a signal from a second beacon device that is located at the provider site for a current order is received at 504. This signal is detected by the courier's mobile device, and includes signal strength and identifying information. The identifying information includes data such as a universally unique identifier (UUID), minor, and major. This information is then transmitted to and received by a server associated with the delivery platform. As mentioned previously, the second beacon device located at the provider site can be either a stand-alone device or can be embedded in a BLE-enabled device located at the provider site. Additionally, it should be noted that although the present example shows that information from the first beacon device is received before information from the second beacon device, information about these signals can be received in any order in this process.

In the present example, once information about a signal from the first beacon device is received, a determination is made at 506 about whether the signal strength of the first beacon device has fallen below a first threshold. This determination is made because when the courier leaves the vehicle, the first signal strength detected at the mobile device decreases in a detectable manner from when the courier is in the vehicle. Specifically, if the first beacon device emits the first signal at a particular strength, then the strength of the first signal that is detected by the mobile device will depend on how far away the mobile device is located from the first beacon device. Accordingly, when the courier is driving or otherwise in the vehicle, the first signal strength detected should lie within a particular range. However, when the courier leaves the vehicle, the signal strength of the first signal falls outside of that range. Accordingly, a first threshold can be set such that if the strength of the signal from the first beacon device is detected to be below a certain threshold, then a determination can be made that the courier has exited the vehicle.

If a determination is made that the signal strength has not fallen below the first threshold, then the process continues to receive and monitor information relating to detection of signals from the first beacon device. In this case, it can be determined that the courier is still in the vehicle and has not yet arrived at the location. If a determination is made that the signal strength has fallen below the first threshold, then a determination can be made that the courier has left the vehicle. However, there may be numerous reasons that the courier has left the vehicle, such as to get gasoline, stop for an errand, etc., other than to pick up the current order at the provider site. Furthermore, the courier may also leave the vehicle for various reasons at a location other than the provider site. For instance, if the courier exits the vehicle to pick up a snack at a convenience store, the system does not want to detect that the courier has arrived at the provider site just because the courier has left the vehicle.

Accordingly, if a determination is made that the first signal strength has fallen below the first threshold, then a determination is made at 508 about whether the signal strength detected from a second beacon device located at the provider site has exceeded a second threshold. This determination is made because when the courier is in proximity of the provider site, the second signal strength detected at the mobile device increases in a detectable manner. Specifically, if the second beacon device emits the second signal at a particular strength, then the strength of the second signal that is detected by the mobile device will depend on how far away the mobile device is located from the second beacon device. Accordingly, when the courier is driving or otherwise located near the provider site, a signal from the second beacon device should be detectable. However, because the strength of the signal from the second beacon device can fluctuate depending on aspects such as whether the courier is driving near the provider site, parking, walking near the provider site, or driving past the provider site, the strength of the signal from the second beacon device doesn't provide enough information about when the courier has actually arrived at the provider site to pick up an order. Accordingly, a second threshold can be set such that if the strength of the signal from the second beacon device is detected to exceed a certain threshold, then a determination can be made that the courier has arrived at the provider site if the signal strength of the first beacon device has also fallen below the first threshold.

If the signal strength of the second beacon device has not exceeded the second threshold, then it can be determined that even though the courier has exited the vehicle, the courier has not arrived at the provider site. The process then continues with the server receiving and monitoring information relating to the detection of signals from the first beacon device and second beacon device. It should be noted that although a determination about the signal strength of the first beacon device is made before a determination about the signal strength of the second beacon device in the present example, these determinations can be made in any order, such as in reverse, at the same time, etc. without deviating from the scope of this process.

In the present example, if the first detected signal strength of the first beacon device falls beneath a first threshold and the second detected signal strength of the second become device exceeds a second threshold, then a determination is made at 510 that the courier has arrived at the provider site for the current order.

As mentioned previously, a similar process can be used to determine when a courier has arrived at a customer delivery location or any other location. In particular, if a customer opts into providing BLE beacon signals or BLE beacon detection through their device by activating or otherwise enabling these features on their device, then determinations can also be made about when a courier has arrived at the customer's delivery location.

Figure 6:
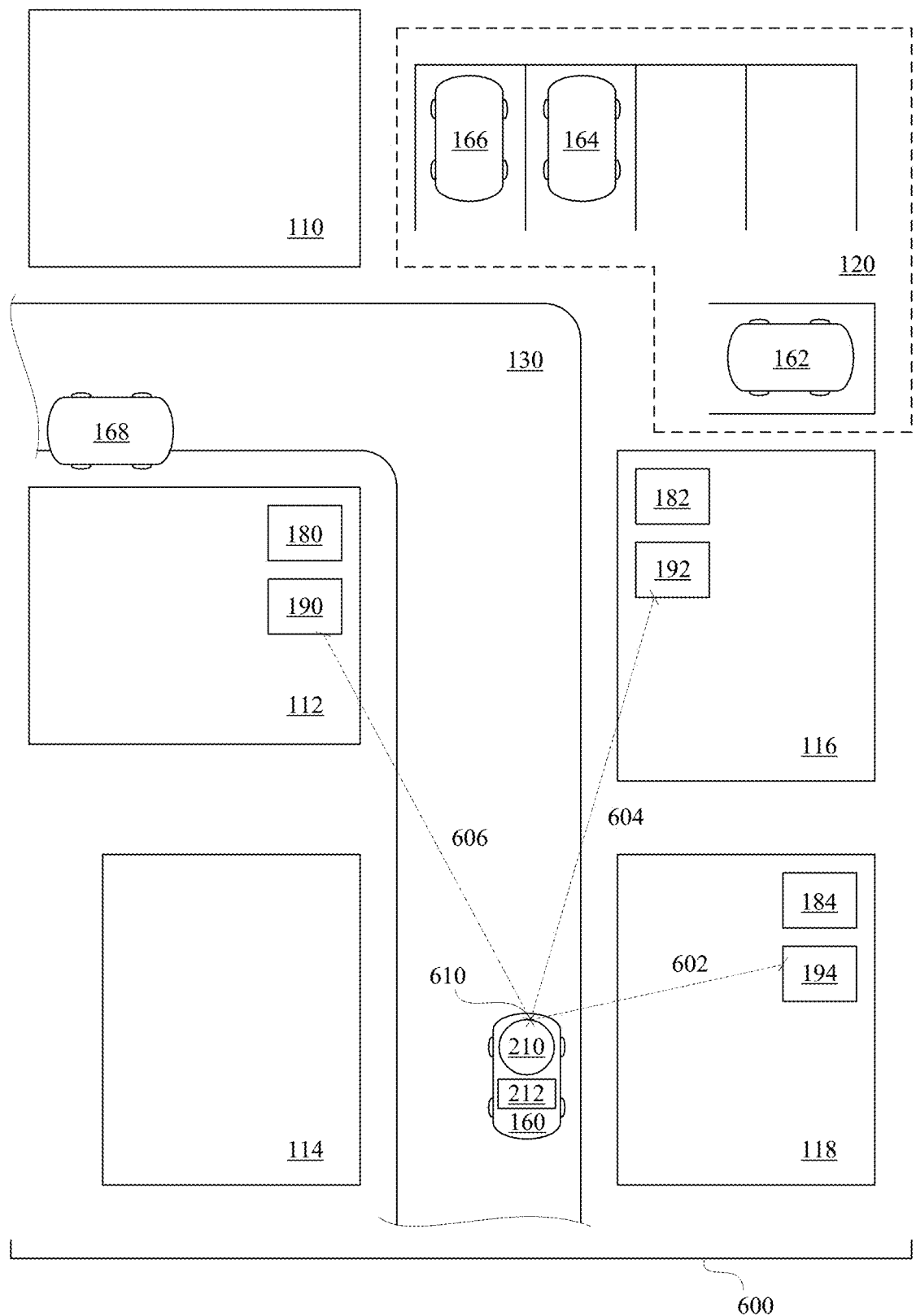
FIG. 6 is one example of a map showing how triangulation can be used to locate a delivery vehicle using information from beacons at provider sites.

With reference to FIG. 6, shown is one example of a map showing how triangulation can be used to locate a delivery vehicle using information from beacons at provider sites. Map 600 is similar to the map described with regard to FIG. 1, where provider sites 112, 116, and 118 and delivery vehicle 160 are affiliated with a delivery platform that provides real-time, on-demand, delivery of perishable goods. Each of the provider sites is equipped with a BLE-enabled device 180, 182, and 184, respectively, and at least one BLE beacon 190, 192, and 194, respectively. The BLE-enabled devices 180, 182, and 184 may be tablets, laptops, or other computing devices that are registered to the provider sites by the delivery platform. In some implementations, the BLE beacon devices 190, 192, and/or 194 may be incorporated into the BLE-enabled device 180, 182, and 184, respectively, such as when the BLE-enabled device is a tablet or other computing device that is capable of both sending and receiving BLE beacon signals.

In the present example, courier 210 has a BLE-enabled mobile device, such as a smartphone, that indicates the location of the courier 210 within the mapped area 600. Accordingly, the reference number 210 is interchangeably used to indicate the courier and the mobile device carried or otherwise kept with the courier. The mobile device 210 is able to detect BLE beacon signals emitted by BLE beacon devices 190, 192, and 194, such as the ones located at provider sites 112, 116, and 118, respectively. Those BLE beacon devices 190, 192, and 194 each emit signals that emanate out a certain radius from the device in multiple directions. Along a particular radius, the strength of the signal emanated becomes weaker as the radius increases. Accordingly, when vehicle 160 is in proximity of provider sites, 112, 116, and 118, BLE-enabled device 210 receives signals from BLE beacon devices 190, 192, and 194 that include information about the identity and signal strength of the BLE beacon devices. From this information, a corresponding radius associated with each of the signals can be determined. For each radius, a circle can be drawn to establish where this signal strength could have been detected. Because the provider sites 112, 116, and 118 are at known locations, the location of the BLE-enabled mobile device 210 can then be estimated as where the three circles intersect.

In the present example, the three circles intersect at a location 610 and is located at a distance 606 from BLE beacon device 190, a distance 604 from BLE beacon device 192, and a distance 602 from BLE beacon device 194. From the signal strength information received at mobile device 210 from the BLE beacon devices 190, 192, and 194, the distances 606, 604, and 602 and the location of the courier 210 can be estimated at location 610.

According to various embodiments, triangulation is used to determine the position of the BLE-enabled mobile device 210. In particular, the location of BLE-enabled mobile device 210 can be determined based on BLE beacon signals received from any three or more BLE beacon devices. Specifically, the signal strength and identification information from these BLE beacon devices can be used to triangulate the position of the BLE-enabled mobile device.

In some examples, a server associated with the delivery platform can use triangulation to determine when the first courier has arrived at a particular provider site. In particular, triangulation can be used to determine when courier 210 has arrived in proximity to a particular provider site. Although triangulation can be used to determine proximity to the provider site, actual arrival at the provider site can be determined based on a detected signal strength from a BLE beacon device 212 that is located in vehicle 160. As described above with regard to various examples, this signal strength falls when courier 210 has left vehicle 160. Accordingly, when the courier 210 is in proximity (as determined by triangulation) and has also left the vehicle 160 (as determined by signal strength from BLE beacon device 212), then a determination can be made that the courier has arrived at the provider site.

Figure 7:
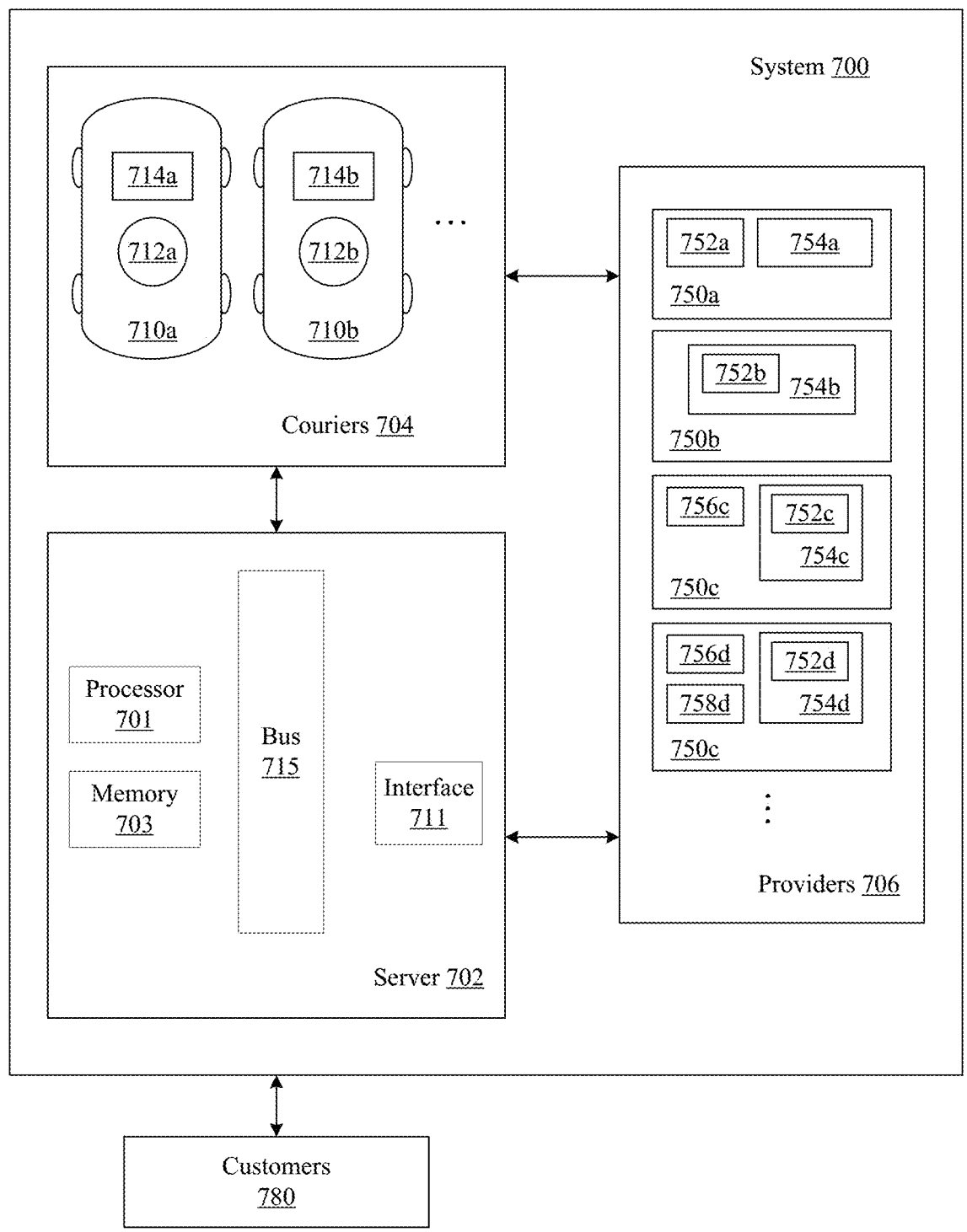
FIG. 7 is one example of a system diagram for a delivery platform, where the delivery platform provides delivery of perishable goods in real time and on demand.

With reference to FIG. 7, shown is one example of a system diagram for a delivery platform, where the delivery platform provides the delivery of perishable goods in real time and on demand to customers ordering through the delivery platform. The system 700 includes a server 702 that is associated with the delivery platform, couriers 704 that transport perishable goods to customers 780 in response to orders by customers 780 through the delivery platform, and providers 706 that prepare the perishable goods in response to orders by customers 780 through the delivery platform.

In the present example, system 700 includes multiple couriers 704 that each has a BLE-enabled mobile device 712 registered to them by the delivery platform. As described in previous examples, because each courier carries or otherwise keeps with them their registered BLE-enabled mobile device, the number 712 is sometimes referred to as the courier or the courier's BLE-enabled device interchangeably. Although only two couriers 712a and 712b are shown with their corresponding vehicles 710a and 710b, respectively, any number of couriers can be included in the system 700. Additionally, although it may be inefficient to have only one courier for the system 700, this is also possible in some implementations. Furthermore, vehicles 710a and 710b each includes a BLE beacon device 714a and 714b, respectively. According to various embodiments, couriers can be people, robots, machines, computing devices, or any other devices or individuals that can transport an order of perishable goods from a provider site to a customer in response to an order through the delivery platform.

System 700 includes multiple providers 706 that each has a BLE-enabled mobile device 754, such as a tablet or other computing device, that is registered to them by the delivery platform. In addition, each provider site 750 includes a BLE beacon device 752. Although four provider sites 750*a*, 750*b*, 750*c*, and 750*d* are shown as participating providers 706, any number of providers and/or provider sites 750 can be included in the system 700. Additionally, although it may be inefficient to have only one provider site for the system 700, this is also possible in some implementations.

As shown in the present figure, some provider sites may have a BLE beacon device that is separate from the provider's BLE-enabled device and some provider sites may have a BLE beacon device that is embedded in or otherwise part of the provider's BLE-enabled device. In particular, provider site 750*a* includes a BLE-enabled device 754*a* and a BLE beacon device 752*a*, whereas provider site 750*b* includes a BLE-enabled device 754*b* that includes an embedded BLE beacon device 752*b*. Furthermore, in some examples, additional BLE beacon devices may also be located at a provider site. For instance, provider site 750*c* includes additional BLE beacon device 756*c* and provider site 750*d* includes additional BLE beacon devices 756*d* and 758*d*.

According to various embodiments, each BLE beacon device issued by the delivery platform and registered to a courier is located in or on that courier's vehicle. Similarly, each BLE beacon device issued by the delivery platform and registered to a provider site is located in or on the corresponding provider site. Each of the BLE beacon devices emits a specific major and minor so that they are tied to a specific courier or provider. BLE beacon devices registered with the delivery platform in system 700 that are in proximity of each other do not emit the same combination of major and minor values.

In the present example, the BLE beacon devices located in the vehicles and provider sites of system 700 use Bluetooth Low Energy to transmit signals that advertise their presence to BLE-enabled devices. In particular, they advertise their identifying information, such as a Universally Unique Identifier (UUID), major, and minor values, along with signal strength. In some examples, one major value may be assigned to all of the couriers and a different major value may be assigned to all of the provider sites. Additionally, minor values may be assigned to uniquely identify each courier and provider site in the system. Accordingly, BLE beacon devices associated with individual couriers or provider sites do not emit the same combination of major and minor values. By assigning major and minor values in this manner, signals can be more efficiently identified so that signals emitted from couriers can be distinguished from signals from provider sites. Furthermore, with specific minor values assigned, particular couriers and provider sites can also be identified based on a detected signal.

According to various embodiments, server 702 is a computer system that is used to implement various aspects of the delivery platform. For instance, various processes and operations described in the examples above, such as determining when a courier has arrived at a particular location, are performed at server 702. Other types of processes may include receiving and processing orders from customers, placing orders with providers, selecting couriers for particular deliveries, generating maps, etc. Although server 702 is shown in a particular configuration, other configurations are possible within the scope of this disclosure. In addition, any number of servers can be used, and other configurations of components can be included.

According to particular example embodiments, a server 702 suitable for implementing particular embodiments of the present invention includes a processor 701, a memory 703, an interface 711, and a bus 715 (e.g., a PCI bus). The interface 711 may include separate input and output interfaces, or may be a unified interface supporting both operations. When acting under the control of appropriate software or firmware, the processor 701 is responsible for such tasks such as optimization. Various specially configured devices can also be used in place of a processor 701 or in addition to processor 701. The complete implementation can also be done in custom hardware. The interface 711 is typically configured to send and receive data packets or data segments over a network. Particular examples of interfaces the device supports include Ethernet interfaces, frame relay interfaces, cable interfaces, DSL interfaces, token ring interfaces, and the like.

In addition, various very high-speed interfaces may be provided such as fast Ethernet interfaces, Gigabit Ethernet interfaces, ATM interfaces, HSSI interfaces, POS interfaces, FDDI interfaces and the like. Generally, these interfaces may include ports appropriate for communication with the appropriate media. In some cases, they may also include an independent processor and, in some instances, volatile RAM. The independent processors may control such communications intensive tasks as packet switching, media control and management.

According to particular example embodiments, the server 702 uses memory 703 to store data and program instructions and maintain a local side cache. The program instructions may control the operation of an operating system and/or one or more applications, for example. The memory or memories may also be configured to store received metadata and batch requested metadata.

Because such information and program instructions may be employed to implement the systems/methods described herein, the present invention relates to tangible, machine readable media that include program instructions, state information, etc. for performing various operations described herein. Examples of machine-readable media include hard disks, floppy disks, magnetic tape, optical media such as CD-ROM disks and DVDs; magneto-optical media such as optical disks, and hardware devices that are specially configured to store and perform program instructions, such as read-only memory devices (ROM) and programmable read-only memory devices (PROMs). Examples of program instructions include both machine code, such as produced by a compiler, and files containing higher level code that may be executed by the computer using an interpreter.

In the present example, the system 700 is used to operate a delivery platform that allows customers 780 to order perishable goods, such as food, drinks, and desserts from restaurants that are delivered on demand in real time. In particular implementations, if a customer opts-into turning on particular features of their devices, the customer's location relative to the couriers can also be determined by the system 700. Consequently, a more accurate determination can be made about when a courier has arrived within a vicinity of the customer's delivery location. If the customer's device is BLE-enabled, the customer's device may be used to detect BLE beacon signals originating from a courier's vehicle and/or mobile device. This information can be used by system 700 to determine when a courier has reached the customer.

Although the figure described in the present example includes various connections between entities, such as between couriers and providers, it should be recognized that these connections are illustrative and may not include direct or unimpeded connections. For instance, in some implementations, couriers 704 and providers 706 may not directly communicate with each other, but may communicate through server 702. In this case, the couriers 704 and providers 706 still communicate with each other, but use the server between them. Similarly, customers are shown as communicating with the system 700 as a whole. This may include communicating directly with server 702 or other entities in the system 700, depending on the implementation.

As described in various embodiments of this disclosure, the location of various couriers can be determined by a delivery platform system using BLE beacon devices and BLE-enabled devices. Additionally, the positions of the couriers relative to various provider sites can also be determined by the delivery platform system. These positions and/or locations can be displayed in some implementations, such as visually through a map provided to various users of the system. For instance, a map showing all of the active provider sites and couriers may be viewable at the server or by operators of the delivery platform. In some examples, the location information may be filtered to display only certain provider sites or delivery vehicles. In one implementation, a customer may have access to a map that shows where the courier is located after the courier picks up their order. This may allow the customer to have a more accurate estimate of when the courier will arrive at the customer's location with the order.

Figure 8:
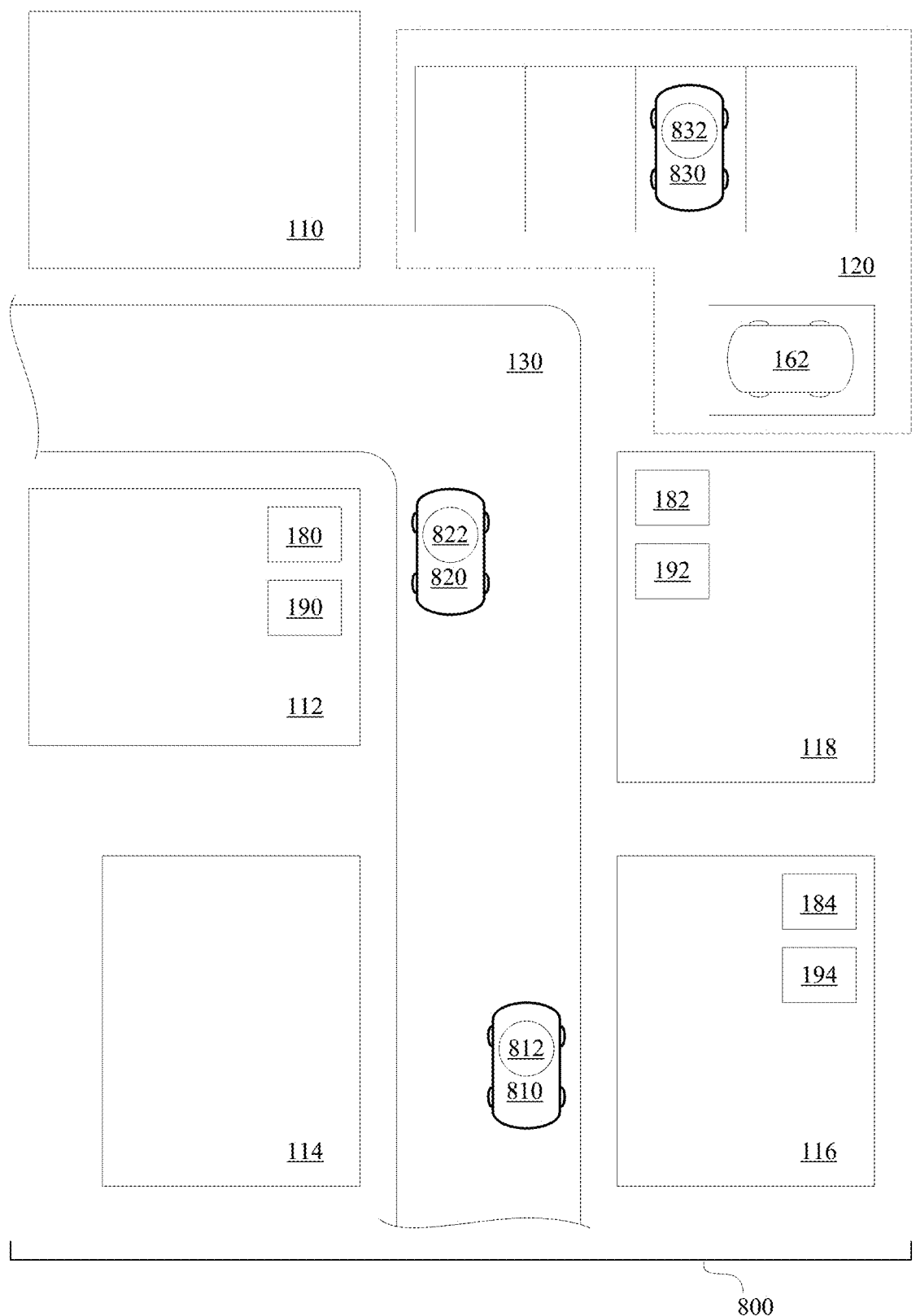
FIG. 8 is one example of a map indicating locations of delivery vehicles participating in a delivery platform.

With reference to FIG. 8, shown is one example of a map indicating locations of delivery vehicles participating in a delivery platform. In this example, delivery vehicles 810, 820, and 830 are shown in bold outlines to indicate that they are actively participating in the delivery platform. These locations are calculated using the mechanisms and processes described in various embodiments above. Furthermore, the locations of the vehicles may be displayed on the map relative to provider sites that have known locations in the system. This type of display may help with showing which couriers 812, 822, and 832 are available to pick up an order in the vicinity of a particular restaurant. For instance, the system may use this map or the data from it to determine which courier should be selected to pick up an order from provider site 116.

According to various embodiments, a courier may become active within the system by opening an application or program for the delivery platform on the courier's BLE-enabled mobile device. In other embodiments, the courier may need to login or enable particular features in the application or program to start receiving orders. Once the courier is active, the courier's mobile device and vehicles may be visible to the system.

Figure 9:
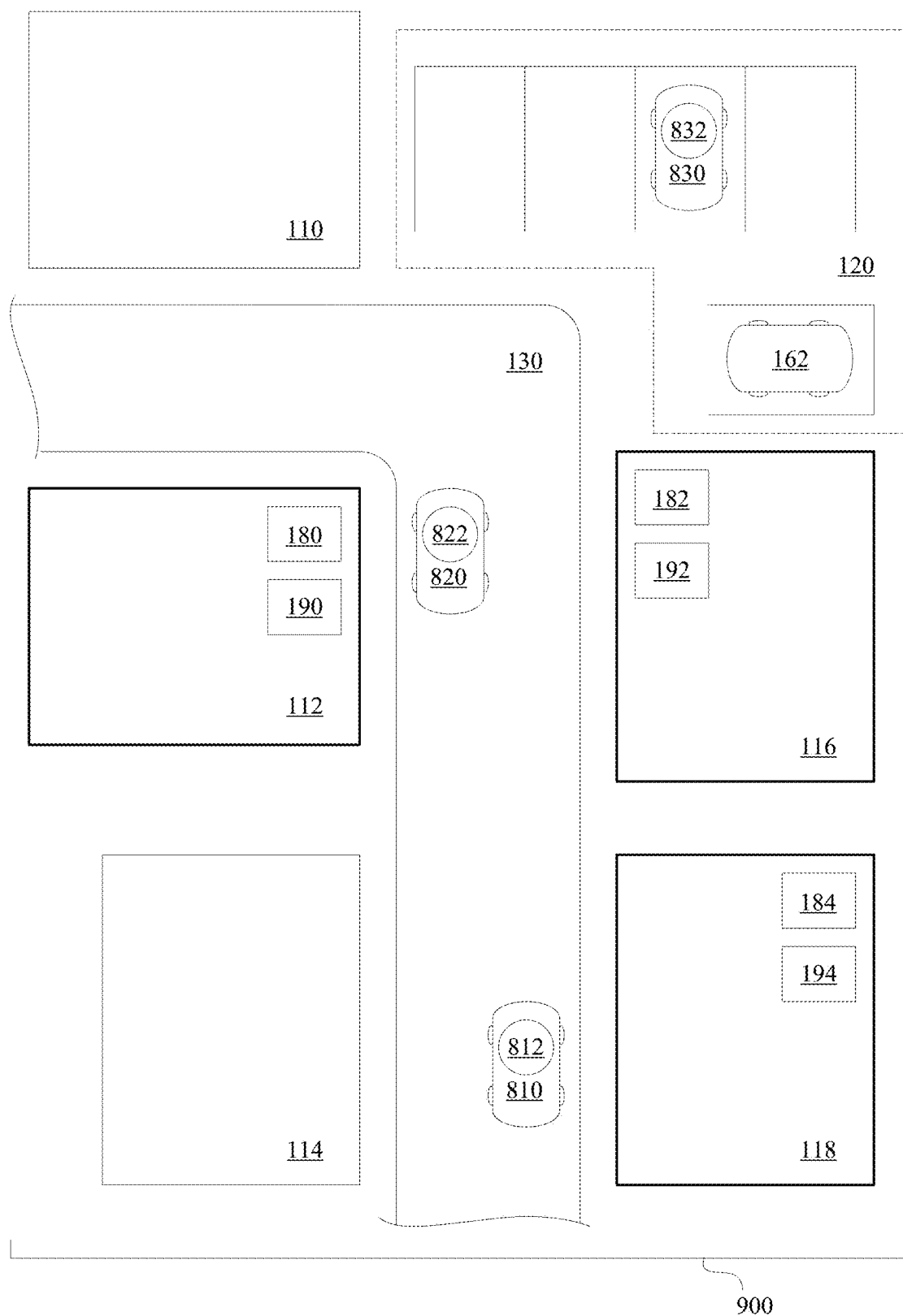
FIG. 9 is one example of a map indicating locations of provider sites participating in a delivery platform.

With reference to FIG. 9, shown is one example of a map indicating locations of provider sites participating in a delivery platform. In this example, provider sites 112, 116, and 118 are shown in bold outlines to indicate that they are actively participating in the delivery platform. These locations can be calculated using the mechanisms and processes described in various embodiments above or can be determined based on a fixed location on a map. The locations of the active provider sites may be displayed on the map to show which provider sites are currently available to take orders through the delivery system. This type of display may help with showing areas where there are one or more restaurants or other providers that may potentially receive orders. In some implementations, couriers may use this map to determine where to wait for delivery assignments. In particular, a courier may be trying to decide where to drive to wait for orders, and may choose to wait in an area that has multiple provider sites that are actively taking orders through the delivery platform. If the delivery platform selects couriers based on their current location, this may help couriers decide where to position themselves in order to get more assignments. Additionally, because couriers can position themselves near active provider sites, this can reduce the amount of time taken for a courier to arrive at a provider site to pick up an order. Accordingly, by providing maps with dynamic information about active participants in the delivery platform, the delivery platform can be operated more efficiently.

In various example embodiments, a provider site may become active within the system by opening an application or program for the delivery device on the provider site's BLE-enabled device. In other embodiments, the provider site may need to login or enable particular features in the application or program to start receiving orders. Once the provider site is active, provider site may be visible to the system.

As mentioned in a previous example, some provider sites may have multiple BLE beacon devices. These beacon devices can allow the system to provide more accurate information about the location of an individual by determining the signal strengths of the various BLE beacon devices detected by a BLE-enabled mobile device carried by the individual. Placing multiple beacon devices is particularly helpful in large spaces and in spaces where GPS signals, cell tower signals, and other signals may not be detectable, such as within large buildings, shopping malls, parking structures, apartment complexes, etc. Accordingly, in the context of locating couriers, providing multiple beacon devices at a location provides more accurate detection of a courier's position in places such as a large food court, a mall, parking structure, department store, grocery store, or other large space.

Figure 10:
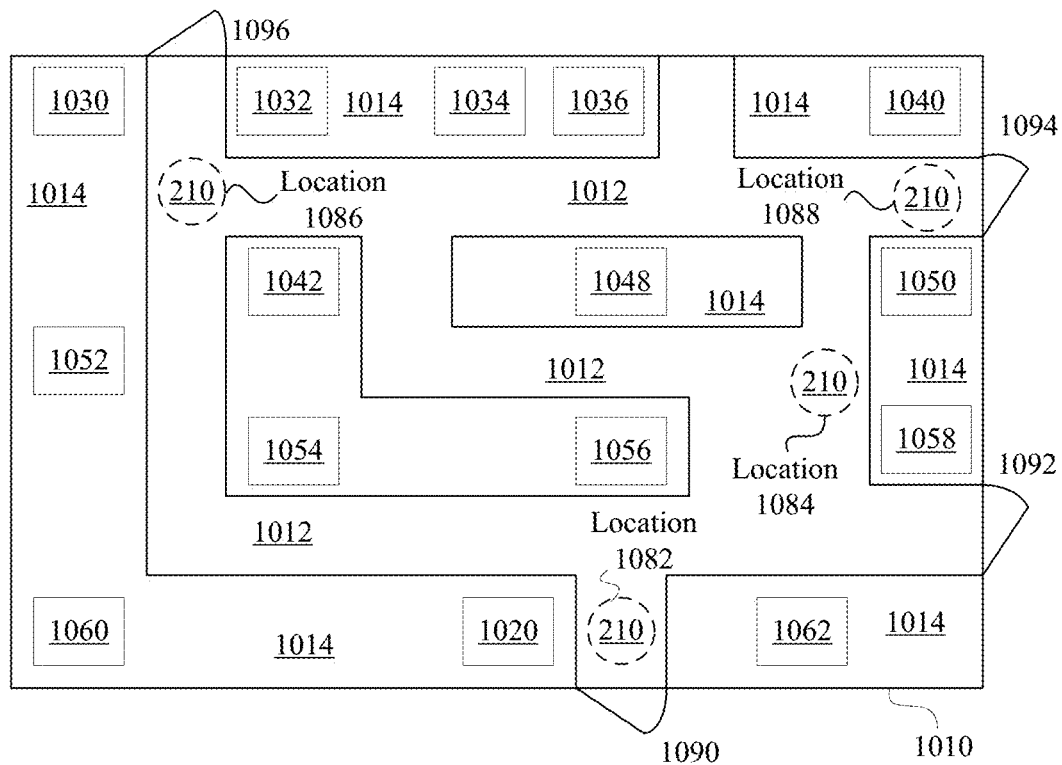
FIG. 10 is one example of a provider site with multiple beacons.
Figure 10:
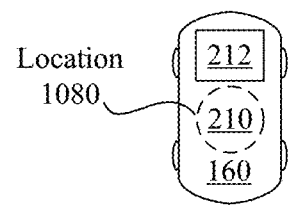

With reference to FIG. 10, shown is one example of a provider site with multiple beacons. In particular, map 1000 includes a vehicle 160 and provider site 1010. A courier, through a BLE-enabled mobile device 210, is detectable at various locations 1080, 1082, 1084, 1086, and 1088. At 1080, the courier 210 is located at vehicle 160. This location can be determined by the proximity of the courier 210 to a BLE beacon device 212 that is located in or on the vehicle 160.

Once the courier 210 reaches provider site 1010, the location of the courier 210 can be calculated based on the identity and strength of signals received from BLE beacon devices 1030, 1032, 1034, 1036, 1040, 1042, 1048, 1050, 1052, 1054, 1056, 1058, 1060, and 1062 located at provider site 1010. In the present example, provider site includes doors 1090, 1092, 1094, 1096, BLE-enabled device 1020, shelving units 1014, and walkways 1012. As the courier 210 moves from location 1082, 1084, 1086, and 1088 within the provider site, these locations are calculated based on methods such as those described above in various examples, such as through triangulation using data received about signal strength and identification information from BLE beacon devices received at the courier's mobile device 210. For instance, location 1086 can be estimated based on the signal strength and identification information received from BLE beacon devices 1030, 1032, and 1042. With the locations of these three BLE beacon devices 1030, 1032, and 1042 known, the location 1086 can be calculated based on triangulation. Any three of the other BLE beacon devices within provider site 1010 can also be used to triangulate the location 1086. In some examples, information from other BLE beacon devices can be used to confirm the accuracy of this location calculation.

Although the present example describes a provider site that is equipped with shelves and walkways, this example can also represent other configurations. For instance, this configuration could represent an apartment building or hotel that has rooms or other features located along 1014 that are accessible by hallways 1012. Similarly, this configuration could represent a mall that has different merchants located along 1014 that are accessible by walkways 1012. This configuration could also represent a department store, supermarket, etc. in some examples.

By allowing a more accurate determination of a courier's location within a larger structure or building like this, a more accurate determination can be made about when a courier has arrived at a particular location within the structure, such as at an order pick up location or customer delivery location. This can be particularly useful in places where GPS signals, cell tower signals, or other location services are weak or inaccessible. In such examples, the major and minor values of the BLE beacon devices can be assigned based on their respective locations within the structure and may reflect whether the whole structure is a single provider or whether the structure houses numerous providers.

The implementation of various examples described in the present disclosure provides significant benefits and advantages over previously available mechanisms and processes. In particular, using BLE beacon devices and BLE-enabled devices to determine the location of couriers does not require couriers to manually enter any location information and does not rely on signal reception from GPS or cell phone towers. Consequently, the signals are more reliable and accurate, thereby allowing more reliable and accurate calculations of a courier's location in the delivery platform system. In addition, the process of delivering orders is simplified for couriers because they don't need to remember to manually enter data about their status and/or location.

According to various embodiments, as more BLE beacon devices are added to the delivery platform's system in any market, a network effect can be created. Specifically, with just one beacon device, relatively good information can be calculated by the system regarding how close a courier is to the beacon. With multiple beacons in the system, the system can use triangulation to determine the position of a courier with significantly greater precision. Accordingly, as more BLE beacon devices are placed within a city or locality, more accurate location information can be calculated for couriers within that city or locality. Similarly, as more BLE beacon devices are placed within a large building or structure, more accurate location information can be calculated for couriers within that building or structure.

While the present disclosure has been particularly shown and described with reference to specific embodiments thereof, it will be understood by those skilled in the art that changes in the form and details of the disclosed embodiments may be made without departing from the spirit or scope of the invention. Specifically, there are many alternative ways of implementing the processes, systems, and apparatuses described. It is therefore intended that the invention be interpreted to include all variations and equivalents that fall within the true spirit and scope of the present invention. Moreover, although particular features have been described as part of each example, any combination of these features or additions of other features are intended to be included within the scope of this disclosure. Accordingly, the embodiments described herein are to be considered as illustrative and not restrictive.

What is claimed is:

1. A system comprising:
   a first beacon device located at a vehicle registered to a courier;
   a second beacon device carried by the courier;
   a first Bluetooth Low Energy (BLE) enabled device located at a provider site, wherein the first BLE-enabled device is configured to detect a first signal strength from the first beacon device and to detect a second signal strength from the second beacon device; and
   a server in communication with the first BLE-enabled device, wherein the server determines that the courier has left the vehicle and arrived at the provider site when a difference between the first signal strength and the second signal strength detected at the first BLE-enabled device exceeds a threshold.

2. The system of claim 1,
   wherein the first BLE-enabled device is further configured to receive first identification information from the first beacon device and second identification information from the second beacon device; and
   wherein the server further determines when the courier has left the vehicle and arrived at the provider site based on the first identification information and the second identification information.

3. The system of claim 1, wherein, after determining that the courier has left the vehicle and arrived at the provider site, the server determines that the courier has received order items from the provider site and has left the provider site when the difference between the first signal strength and the second signal strength detected at the first BLE-enabled device falls below the threshold.

4. The system of claim 1, wherein the second beacon device is embedded in a second BLE-enabled device carried by the courier.

5. The system of claim 1,
   wherein the server is in communication with a second BLE-enabled device located at a delivery location, wherein the second BLE-enabled device is configured to detect a third signal strength from the first beacon device and to detect a fourth signal strength from the second beacon device
   wherein the server determines that the courier has left the vehicle and arrived at the delivery location when a difference between the third signal strength and the fourth signal strength detected at the second BLE-enabled device exceeds the threshold.

6. The system of claim 5, wherein, after determining that the courier has left the vehicle and arrived at the delivery location, the server determines that the courier has delivered order items to a customer corresponding to the delivery location when the difference between the third signal strength and the fourth signal strength detected at the second BLE-enabled device falls below the threshold.

7. The system of claim 5, wherein the second BLE-enabled device is a computing device associated with a customer corresponding to the delivery location.

8. A method comprising:
   detecting a first signal strength from a first beacon device located at a vehicle registered to a courier, wherein the first signal strength is detected by a first Bluetooth Low Energy (BLE) enabled device located at a provider site;
   detecting a second signal strength from a second beacon device carried by the courier, wherein the second signal strength is detected by the first BLE-enabled device;
   wherein information about the first signal strength and the second signal strength are transmitted to a server; and wherein the server monitors the first signal strength and the second signal strength and determines that the courier has left the vehicle and arrived at the provider site when a difference between the first signal strength and the second signal strength detected at the first BLE-enabled device exceeds a threshold.

9. The method of claim 8,
wherein the first BLE-enabled device is further configured to receive first identification information from the first beacon device and second identification information from the second beacon device; and
wherein the server further determines when the courier has left the vehicle and arrived at the provider site based on the first identification information and the second identification information.

10. The method of claim 8, wherein, after determining that the courier has left the vehicle and arrived at the provider site, the server determines that the courier has received order items from the provider site and has left the provider site when the difference between the first signal strength and the second signal strength detected at the first BLE-enabled device falls below the threshold.

11. The method of claim 8, wherein the second beacon device is embedded in a second BLE-enabled mobile device carried by the courier.

12. The method of claim 8, further comprising
receiving, at the server, information about a third signal strength and a fourth signal strength;
wherein the third signal strength is detected from the first beacon device at a second BLE-enabled device located at a delivery location;
wherein the fourth signal strength is detected from the second beacon device at the second BLE-enabled device;
wherein the server determines that the courier has left the vehicle and arrived at the delivery location when a difference between the third signal strength and the fourth signal strength detected at the second BLE-enabled device exceeds the threshold.

13. The method of claim 12, wherein, after determining that the courier has left the vehicle and arrived at the delivery location, the server determines that the courier has delivered order items to a customer corresponding to the delivery location when the difference between the third signal strength and the fourth signal strength detected at the second BLE-enabled device falls below the threshold.

14. The method of claim 12, wherein the second BLE-enabled device is a computing device associated with a customer corresponding to the delivery location.

15. A server comprising:
a processor and memory, wherein the processor is configured for:
receiving first signal information from a first BLE-enabled device located at a provider site, wherein the first signal information corresponds to a first signal received at the first BLE-enabled device from a first beacon device located at a vehicle registered to a courier, the first signal information indicating a first signal strength detected at the first BLE-enabled device;
receiving second signal information from the first BLE-enabled device, wherein the second signal information corresponds to a second signal received at the first BLE-enabled device from a second beacon device carried by the courier, the second signal information indicating a second signal strength detected at the first BLE-enabled device; and
monitoring the first signal strength and the second signal strength, and determining that the courier has left the vehicle and arrived at the provider site when a difference between the first signal strength and the second signal strength detected at the first BLE-enabled device exceeds a threshold.

16. The server of claim 15,
wherein the first signal information further includes first identification information of the first beacon device, and the second signal information further includes second identification information of the second beacon device; and
wherein the processor is further configured to determine when the courier has left the vehicle and arrived at the provider site based on the first identification information and the second identification information.

17. The server of claim 15, wherein, after determining that the courier has left the vehicle and arrived at the provider site, the processor is configured for determining that the courier has received order items from the provider site and has left the provider site when the difference between the first signal strength and the second signal strength detected at the first BLE-enabled device falls below the threshold.

18. The server of claim 15, wherein the second beacon device is embedded in a second BLE-enabled device carried by the courier.

19. The server of claim 15, wherein the processor is further configured for:
receiving third signal information from a second BLE-enabled device located at a delivery location, wherein the third signal information corresponds to the first signal received at the second BLE-enabled device from the first beacon device, the third signal information indicating a third signal strength detected at the first BLE-enabled device;
receiving fourth signal from the second BLE-enabled device, wherein the fourth signal information corresponds to the second signal received at the second BLE-enabled device from the second beacon device, the fourth signal information indicating a fourth signal strength detected at the second BLE-enabled device; and
monitoring the third signal strength and the fourth signal strength, and determining that the courier has left the vehicle and arrived at the delivery location when a difference between the third signal strength and the fourth signal strength detected at the second BLE-enabled device exceeds a threshold.

20. The server of claim 19, wherein, after determining that the courier has left the vehicle and arrived at the delivery location, the processor is further configured for determining that the courier has delivered order items to a customer corresponding to the delivery location when the difference between the third signal strength and the fourth signal strength detected at the second BLE-enabled device falls below the threshold.

* * * * *